(12) United States Patent
Barnet et al.

(10) Patent No.: US 9,177,037 B2
(45) Date of Patent: Nov. 3, 2015

(54) IN-MEMORY RUNTIME FOR MULTIDIMENSIONAL ANALYTICAL VIEWS

(71) Applicants: Sonja Barnet, Viernheim (DE); Dirk Baumgaertel, Wiesloch (DE)

(72) Inventors: Sonja Barnet, Viernheim (DE); Dirk Baumgaertel, Wiesloch (DE)

(73) Assignee: SAP SE, Walldorf (DE)

( * ) Notice: Subject to any disclaimer, the term of this patent is extended or adjusted under 35 U.S.C. 154(b) by 170 days.

(21) Appl. No.: 13/733,062

(22) Filed: Jan. 2, 2013

(65) Prior Publication Data

US 2014/0188782 A1    Jul. 3, 2014

(51) Int. Cl.
*G06F 17/30* (2006.01)

(52) U.S. Cl.
CPC .... *G06F 17/30592* (2013.01); *G06F 17/30501* (2013.01)

(58) Field of Classification Search
CPC .................. G06F 17/30592; G06F 17/30873; G06F 17/30501
USPC ......... 707/600, 706, 708, 602, 722, 748, 749, 707/769
See application file for complete search history.

(56) References Cited

U.S. PATENT DOCUMENTS

| | | | |
|---|---|---|---|
| 7,562,073 | B2 | 7/2009 | Woehler et al. |
| 8,261,248 | B2 | 9/2012 | Brendle et al. |
| 8,412,549 | B2 | 4/2013 | Graeber et al. |
| 2003/0074375 | A1* | 4/2003 | Nakamura et al. ............ 707/200 |
| 2009/0240663 | A1* | 9/2009 | Plattner et al. .................... 707/3 |
| 2011/0264487 | A1 | 10/2011 | Koerner |
| 2012/0030256 | A1 | 2/2012 | Pfeifer et al. |
| 2012/0158838 | A1 | 6/2012 | Memar-Zahedani et al. |
| 2012/0166620 | A1 | 6/2012 | Said et al. |
| 2012/0173522 | A1 | 7/2012 | Girsig et al. |
| 2012/0173584 | A1 | 7/2012 | Schmoigl et al. |
| 2012/0174013 | A1 | 7/2012 | Kraus et al. |
| 2013/0030867 | A1 | 1/2013 | Wagner et al. |
| 2013/0086547 | A1 | 4/2013 | Said et al. |
| 2013/0124545 | A1 | 5/2013 | Holmberg et al. |

* cited by examiner

*Primary Examiner* — Md. I Uddin
(74) *Attorney, Agent, or Firm* — Mintz Levin Cohn Ferris Glovsky and Popeo, P.C.

(57) ABSTRACT

A multi-dimensional analytical view (MDAV) calculation can be enhanced by use of an in-memory MDAV runtime at a search engine server. The in-memory MDAV runtime can perform all or some of the processing required to respond to a data request that requires some analytical processing.

13 Claims, 6 Drawing Sheets

IN-MEMORY RUNTIME FOR MULTIDIMENSIONAL ANALYTICAL VIEWS

TECHNICAL FIELD

The subject matter described herein relates to analytical operations on data in a database or the like.

BACKGROUND

Modern business software frameworks (also referred to as business software architectures, business applications, etc.) and other software solutions typically include or are based on databases, database management systems, or other information retrieval technology. At the core of such services is the ability to reply quickly and accurately to received queries (e.g. a formal statement of information needs) or other requests from a user, a consuming entity (e.g. a web service, another software solution or the like that requires access to data, etc.), a request for information, requirements to generate reports, etc. In general, a response or result set generated based on a query can be characterized as a report, which can include results of the query in electronic or other formats. Many modern business software frameworks (e.g. enterprise resource planning solutions, customer relationship management solutions, sales performance solutions, etc.) include one or more data models or varying levels of complexity for organizing, accessing, and presenting data. In such frameworks, it is common to respond to a request for a report, a view, or other analytical content by invoking one or more multidimensional models, which can also be referred to as multidimensional analytical views (MDAVs).

SUMMARY

In one aspect, a method includes initiating an in-memory multidimensional analytical view (MDAV) runtime upon receipt of a data request and preprocessing data necessary for responding to the data request using the in-memory MDAV runtime. The initiating occurs in-memory at a search engine server of a business software framework. The in-memory MDAV runtime creates a calculation model for execution by a calculation engine of the search engine server. The calculation engine aggregates the data necessary for responding to the data request, and a final result is generated by an application server MDAV runtime implemented at the application server. The generating is based at least in part on the aggregated data.

In some variations one or more of the following can optionally be included in any feasible combination. The search engine server can include an in-memory text retrieval and information extraction (TREX) server. The aggregating can include the in-memory MDAV runtime executing a complex multidimensional analytical view in a single step using the calculation engine. The aggregating can be performed in lieu of a complete replication of the data necessary for responding to the data request from the search engine server to the application server. Changes made to the data necessary for responding to the data request can be stored in a temporary index at the search engine server. The calculation model can refer to the temporary index in reading the data necessary for responding to the data request. At least one of the in-memory MDAV runtime and the application server MDAV runtime can include an online analytical processing (OLAP) runtime.

Implementations of the current subject matter can include, but are not limited to, systems and methods including one or more features described herein as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The data accessed by a MDAV is typically stored on a search engine server, such as for example a wherein the operations (TREX) engine server or the like. In conventional approaches, an analytics runtime framework can handle delivery of the data from the search engine server to one or more analytical engines, which can be online analytical processing (OLAP) engines. A MDAV can act as a data provider for the analytical engine. Implementation of the analytical engine can occur in a so-called "MDAV runtime."

Figure 1:
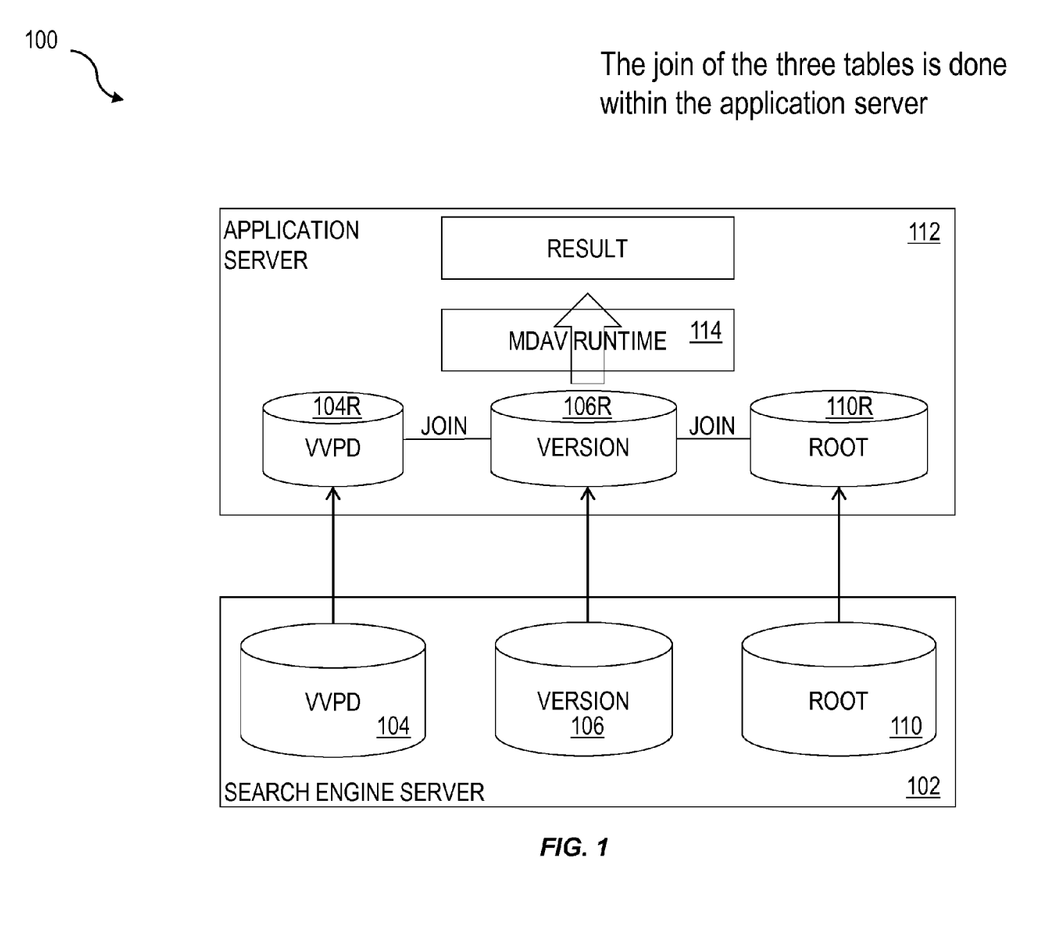
FIG. 1 shows a software framework diagram illustrating replication of data structures to an application server for generation of a result.

FIG. 1 shows an example framework 100 illustrating features of this approach for analytical task such as a join of two or more tables. In this example, the search engine server 102 includes three data structures 104, 106, 110, which can be tables, objects, etc. To execute a join, the three data structures 104, 106, 110 are replicated to an application server 112, thereby creating replicated structures 104R, 106R, 110R. The application server 112, which can optionally be implemented in the Advanced Business Application Programming (ABAP) language can then implement an application server MDAV runtime 114 to perform one or more analytical operations necessary to generate a result 116. In this example, most data operations are executed on the application server 112. Only basis aggregation operations are typically executed at the search engine server 102 prior to replicating the data structures 104, 106, 110 to the application server 112. The performance cost of replicating the data structures 104, 106, 110 to the application server 112 can be mitigated by the performance improvement of performing analytical operations in main system memory instead of on-disk.

Figure 2:
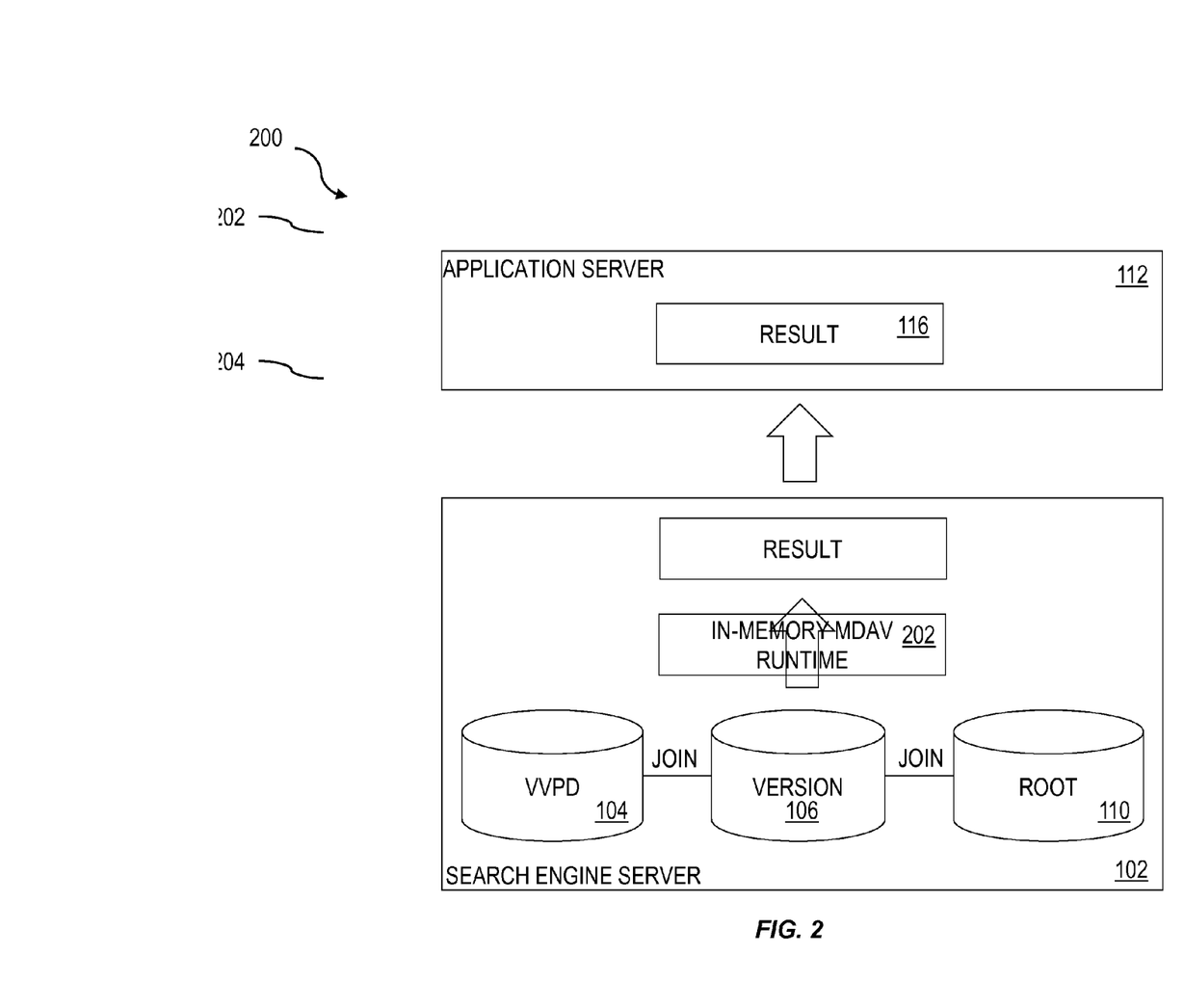
FIG. 2 shows a software framework diagram illustrating execution of analytical task to generate a result at a search engine server.

An improvement consistent with implementations of the current subject matter is illustrated in the framework 200 of FIG. 2. An in-memory MDAV runtime 202 can be implemented at the search engine server level 102 and can execute at least some of the data operations (such as union, join, filtering temporal data) directly on the search engine server. Especially for very large data sets, a performance improvement can be realized by such an approach, because the need to replicate large tables or other data structures 104, 106, 110 to the application server 112 can be reduced or even eliminated.

An application server multi-dimensional analytical view (MDAV) runtime 114, which is implemented at the application server 112, typically includes execution of a set of complex MDAVs such that all part providers are executed sequentially including its transformation callbacks in the order from tree leaf to the tree root. In contrast, an in-memory MDAV runtime 202 consistent with implementations of the current subject matter can allow the execution of complex MDAVs in one step via a calculation engine at the search engine server 102 (e.g. by a TREX calculation engine). In practice, callbacks defined for the MDAV part providers can only be executed in post processing after the data are completely read from TREX, when the union and/or join operations are already executed.

Various types of analytics content can be supported by different MDAV types, which can include a basic MDAV, a union MDAV, a join MDAV, a virtual MDAV, and a planning MDAV. Consistent with implementations of the current subject matter, virtual and planning MDAVs can be executed by the application server MDAV runtime 114. A basic MDAV, a union MDAV, a join MDAV, and the like can advantageously by executed by the in-memory MDAV runtime 202 at the search engine server 102.

The model of a planning MDAV can be enhanced consistent with implementations of the current subject matter. For example, each MDAV element can additionally contain information of a related index and field from the search engine server 102 (e.g. a related TREX index and field). Using this information, the in-memory MDAV runtime 202, which is implemented at the search engine server 102, can create a calculation model, which can be executed using a calculation engine of the search engine server 102 (e.g. a TREX calculation engine). As a result, planning data can be returned to the application server 112 in an aggregated form that can reduce the need for full replication of data structures (e.g. tables, etc.) from the search engine server 102 to the application server 112. After the planning data are pre-processed by the in-memory MDAV runtime 202 at the search engine server 102, the application server MDAV runtime 114 can be used on the aggregated data.

Figure 3:
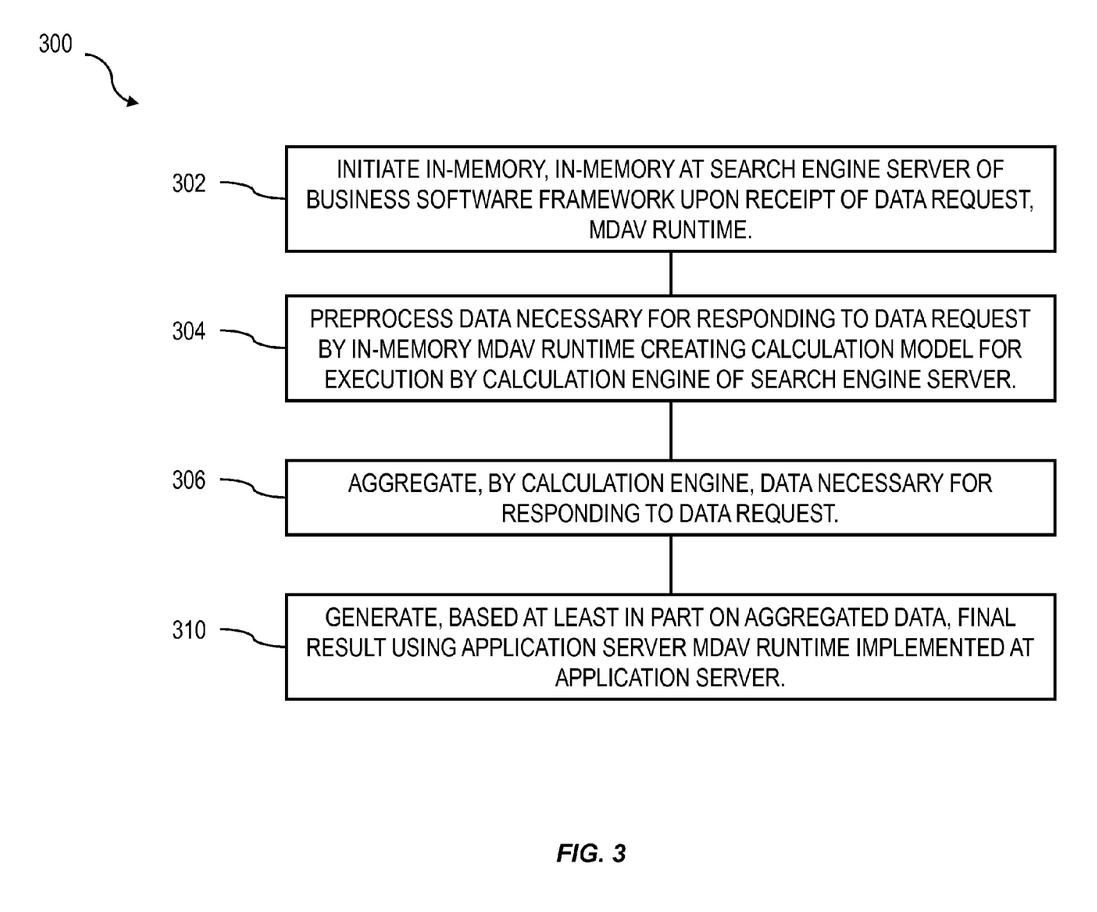
FIG. 3 shows a process flow diagram illustrating aspects of a method having one or more features consistent with implementations of the current subject matter.

FIG. 3 shows a process flow chart 300 illustrating method features that appear individually or in one or more feasible combinations in various implementations of the current subject matter. At 302, upon receipt of a data request, an in-memory MDAV runtime 202 is initiated in-memory at a search engine server 102. At 304, data necessary for responding to the data request are preprocessed by the in-memory MDAV runtime 202, which can create a calculation model for execution by a calculation engine of the search engine server 102. The data necessary for responding to the data request are aggregated by the calculation engine and passed to an application server MDAV runtime 114 at 306. A final result is generated by the application server MDAV runtime 114 based at least in part on the aggregated data at 310.

When changes are made, for example to transactional data in the course of business of an organization, etc., changes that have been made to the data can be stored within a transaction in a temporary index at the search engine server 102. A calculation model used in the in-memory MDAV runtime 202 can refer to this temporary index at the search engine server 102 containing the transactional changes in order to be used to read the current planning data.

In general, a search engine server 102 as discussed herein can support various kinds of text search, including exact search, boolean search, wildcard search, linguistic search (grammatical variants are normalized for the index search) fuzzy search (input strings that differ by a few letters from an index term are normalized for the index search), and the like. A result 116 (e.g. a result set) can be ranked using term frequency-inverse document frequency (TF-IDF) weighting, and results can include snippets with the search terms highlighted. The search engine server 102 can support text mining and classification using a vector space model. Groups of documents can be classified using query-based classification, example based classification, or a combination of these plus keyword management. The search engine server can support structured data search not only for document metadata but also for mass business data and data in business objects o other data objects or data structures. Indexes for structured data can be implemented compactly using data compression and the data can be aggregated in linear time, to enable large volumes of data to be processed entirely in memory. The search engine server 102 can also include one or more of a join engine to join structured data from different fields in business objects, a fast update capability to write a delta index beside a main index and to merge them offline while a second delta index takes updates, a data mining feature pack for advanced mathematical analysis, and the like.

Figure 4:
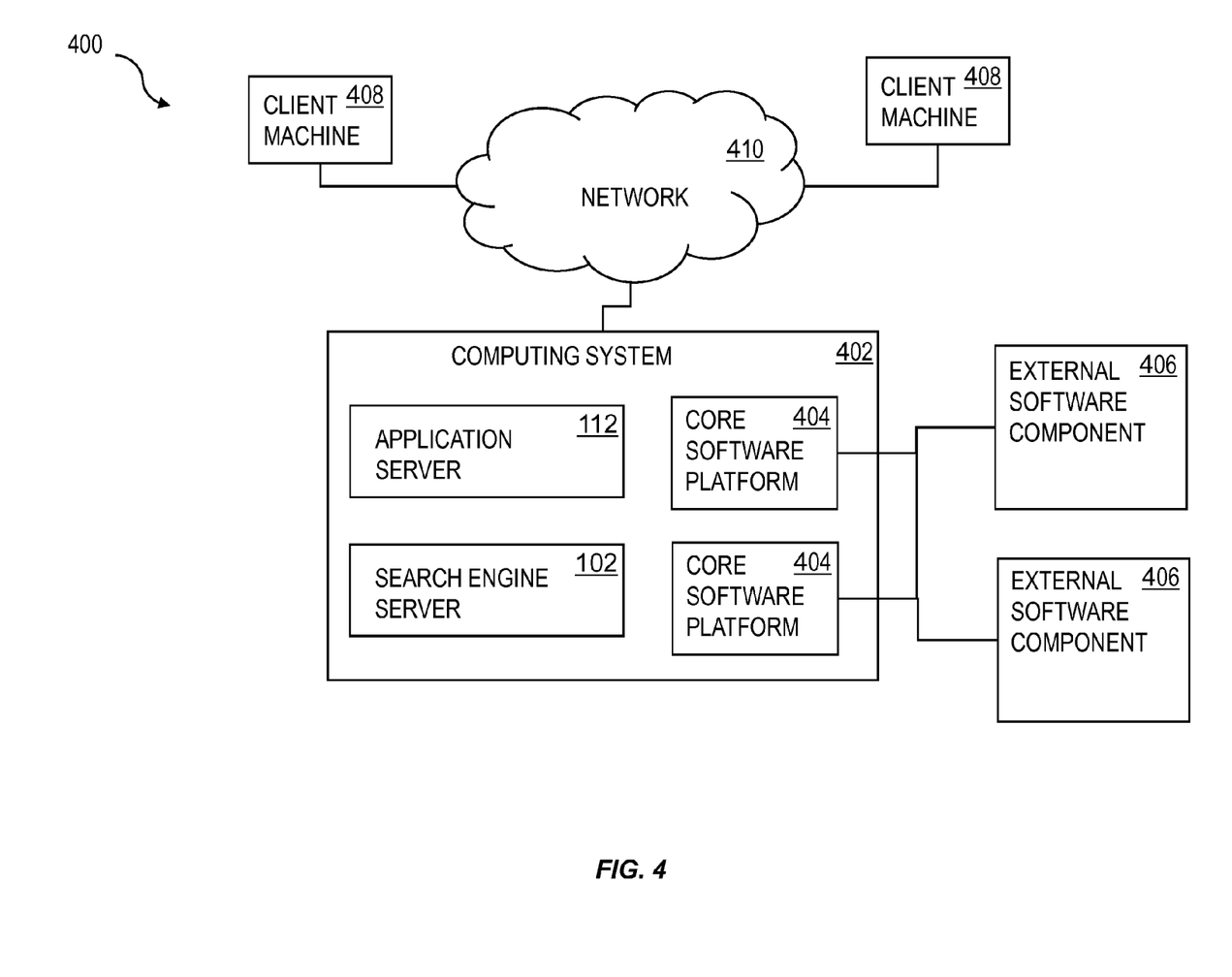
FIG. 4 shows a diagram illustrating features of a business software system architecture consistent with at least some implementations of the current subject matter.

Consistent with some implementations of the current subject matter, the core software platform of an enterprise resource planning (ERP) system, other business software architecture, or other data-intensive computing application or software architecture can be provided as a standalone, customized software installation that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 4 shows a diagram of a system consistent with such an implementation. A computing system 402 can include one or more core software platform modules 404 providing one or more features of the business software system. The computing system can also aggregate or otherwise provide a gateway via which users can access functionality provided by one or more external software components 406. Client machines 408 can access the computing system, either via a direct connection, a local terminal, or over a network 410 (e.g. a local area network, a wide area network, a wireless network, the Internet, or the like). An application server 112 and search engine server 112 can be implemented, optionally both by the computing system or on separate computing systems. The application server 112 and search engine server 112 can perform consistent with one or more implementations of the current subject matter as discussed above.

Figure 5:
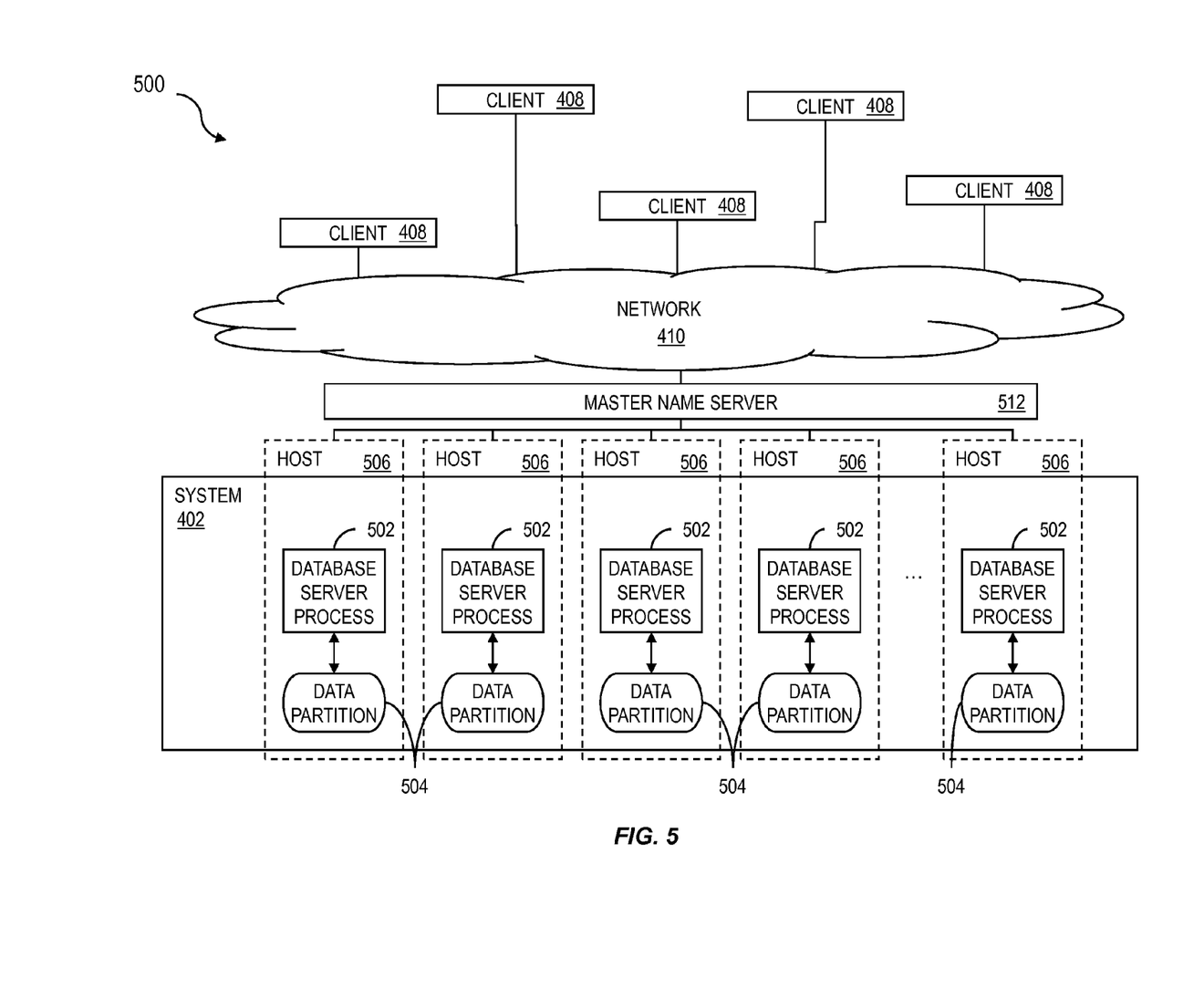
FIG. 5 shows a diagram illustrating features of a database management system architecture consistent with at least some implementations of the current subject matter.

For data distribution purposes, tables or ranges within tables can be assigned to different database partitions that are assigned to different hosts, for example for scalability reasons. FIG. 5 shows an example of an enterprise resource system architecture 500 consistent with an implementation that includes data distribution for scalability reasons. Such a configuration can be used for large, on-premise or stand-alone systems with high performance requirements. Each data server process 502 and its associated data partition 504 can be assigned to a discrete host 506. A host 506 can be a standalone machine with one or more physical processors or a virtual machine on a larger system 402 as depicted in FIG. 5. A central component, labeled as a name server 512 in FIG. 5, knows the topology of the system and how data is distributed. In a system with data distribution, the name server knows which tables or partitions of tables are located on which data server process 502. One or more clients 514 (e.g. client machines 408) can access the name server 512, either via a direct connection or over a network 516.

In a data distribution scenario, the partitioning can be done table wise or also by splitting tables. With table wise partitioning, the name server assigns new tables to a database server process 502 based on the current distribution of tables (number of tables assigned to each database server process 502). Then data for this table will reside only on that database server process 502. It is also possible to specify that a table is split over multiple database server processes 502. The name server 512 can optionally partition the table based on a size estimation specified by the application. When records are inserted into a split table, the records can be distributed to other database server processes 502 based on name server information.

Smaller organizations can also benefit from use of business software functionality. However, such an organization may lack the necessary hardware resources, IT support, and/or consulting budget necessary to make use of a standalone business software software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 6:
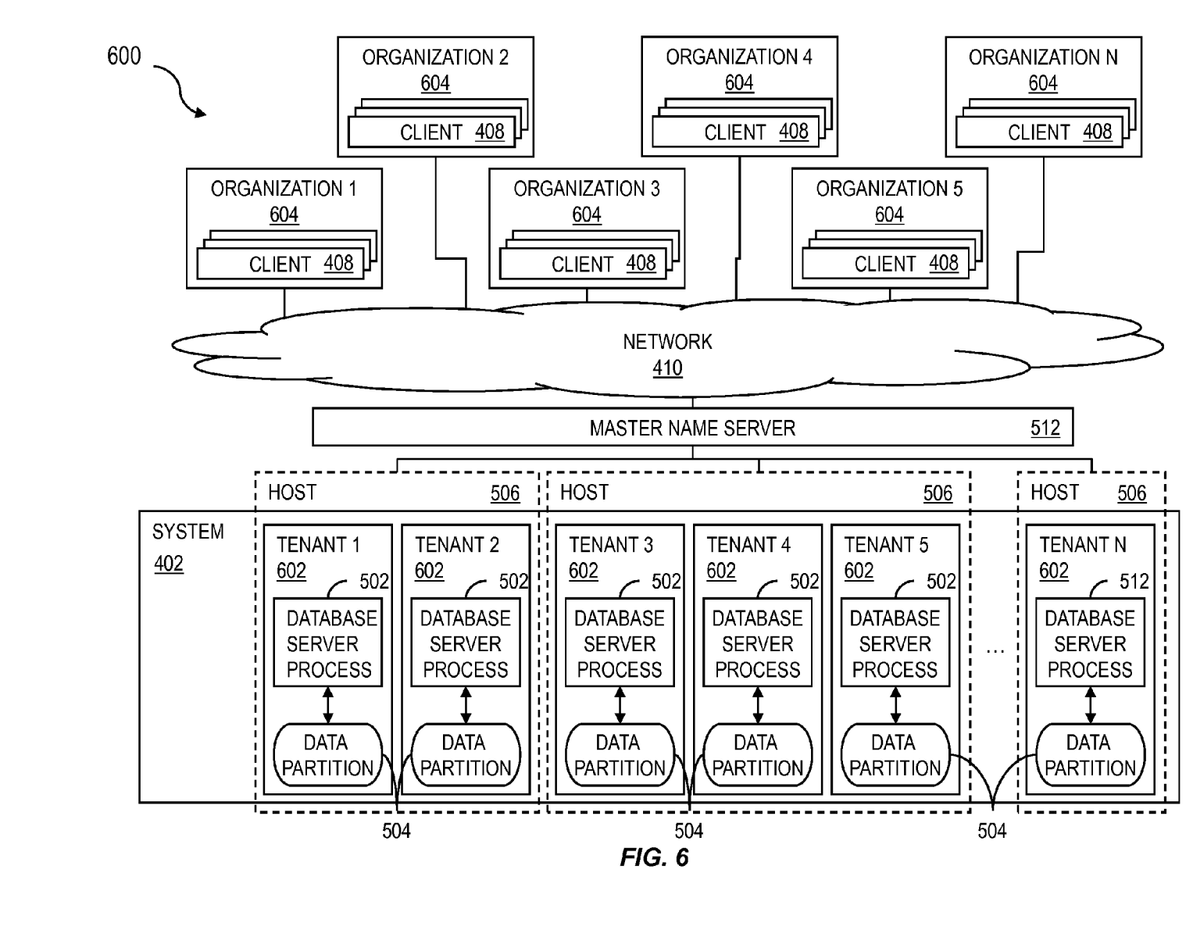
FIG. 6 shows a diagram illustrating features of another database management system architecture consistent with at least some implementations of the current subject matter.

Data partitioning consistent with implementations of the current subject matter can also be used in a multi-tenancy environment as illustrated in the system architecture 600 of FIG. 6. Multiple tenants 602, each isolated from one another and available to be accessed by clients 514 within a separate organization 604 of a plurality of organizations via a network 516, can be hosted by a same host 506, which can be a virtual machine on a larger system 402 as shown in FIG. 6 or a separate system that includes one or more physical processors. Tenants 602 can also optionally be distributed across multiple database server processes 502 on more than one host 506. In this manner, tables or ranges within tables are assigned to different database server processes 502 that are assigned to different hosts 506 for scalability reasons. One or more tenants 602 can alternatively be served by a single database server process 502 accessing a data partition 504 (or multiple data partitions 504) for the respective tenant 602 that is isolated from other tenants 602.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
   initiating, upon receipt of a data request, an in-memory multidimensional analytical view (MDAV) runtime, the initiating occurring in-memory at a search engine server of a business software framework;
   preprocessing, by the in-memory MDAV runtime, data necessary for responding to the data request, the in-memory MDAV runtime creating a calculation model for execution by a calculation engine of the search engine server;
   aggregating, by the calculation engine, the data necessary for responding to the data request and passed to an application server MDAV runtime, the aggregating comprising the in-memory MDAV runtime executing a complex multidimensional analytical view in a single step using the calculation engine wherein the aggregating operations are executed at the search engine server prior to replicating data structures to an application server;
   storing changes made to the data necessary for responding to the data request in a temporary index at the search engine server, wherein the calculation model refers to the temporary index in reading the data necessary for responding to the data request; and
   generating a final result, by the application server MDAV runtime implemented at the application server, the generating being based at least in part on the aggregated data wherein the final result is ranked using term frequency-inverse document frequency weighting, and wherein the final result comprises a snippet in which a search term of the data request is highlighted.

2. A computer program product as in claim 1, wherein the search engine server comprises an in-memory text retrieval and information extraction (TREX) server.

3. A computer program product as in claim 1, wherein the aggregating is performed in lieu of a complete replication of the data necessary for responding to the data request from the search engine server to the application server.

4. A computer program product as in claim 1, wherein at least one of the in-memory MDAV runtime and the application server MDAV runtime comprises an online analytical processing (OLAP) runtime.

5. A system comprising:
   at least one programmable processor; and
   a non-transitory machine-readable medium storing instructions that, when executed by the at least one processor, cause the at least one programmable processor to perform operations comprising:
   initiating, upon receipt of a data request, an in-memory multidimensional analytical view (MDAV) runtime, the initiating occurring in-memory at a search engine server of a business software framework;
   preprocessing, by the in-memory MDAV runtime, data necessary for responding to the data request, the in-memory MDAV runtime creating a calculation model for execution by a calculation engine of the search engine server;
   aggregating, by the calculation engine, the data necessary for responding to the data request and passed to an application server MDAV runtime, the aggregating comprising the in-memory MDAV runtime executing a complex multidimensional analytical view in a single step using the calculation engine wherein the aggregating operations are executed at the search engine server prior to replicating data structures to an application server;
   storing changes made to the data necessary for responding to the data request in a temporary index at the search engine server, wherein the calculation model refers to the temporary index in reading the data necessary for responding to the data request; and
   generating a final result, by the application server MDAV runtime implemented at the application server, the generating being based at least in part on the aggregated data wherein the final result is ranked using term frequency-inverse document frequency weighting, and wherein the final result comprises a snippet in which a search term of the data request is highlighted.

6. A system as in claim 5, wherein the search engine server comprises an in-memory text retrieval and information extraction (TREX) server.

7. A system as in claim 5, wherein the aggregating is performed in lieu of a complete replication of the data necessary for responding to the data request from the search engine server to the application server.

8. A system as in claim 5, wherein at least one of the in-memory MDAV runtime and the application server MDAV runtime comprises an online analytical processing (OLAP) runtime.

9. A method comprising:
initiating, upon receipt of a data request, an in-memory multidimensional analytical view (MDAV) runtime, the initiating occurring in-memory at a search engine server of a business software framework;
preprocessing, by the in-memory MDAV runtime, data necessary for responding to the data request, the in-memory MDAV runtime creating a calculation model for execution by a calculation engine of the search engine server;
aggregating, by the calculation engine, the data necessary for responding to the data request and passed to an application server MDAV runtime, the aggregating comprising the in-memory MDAV runtime executing a complex multidimensional analytical view in a single step using the calculation engine wherein the aggregating operations are executed at the search engine server prior to replicating data structures to an application server;
storing changes made to the data necessary for responding to the data request in a temporary index at the search engine server, wherein the calculation model refers to the temporary index in reading the data necessary for responding to the data request; and
generating a final result, by the application server MDAV runtime implemented at the application server, the generating being based at least in part on the aggregated data wherein the final result is ranked using term frequency-inverse document frequency weighting, and wherein the final result comprises a snippet in which a search term of the data request is highlighted.

10. A computer-implemented method as in claim 9, wherein the search engine server comprises an in-memory text retrieval and information extraction (TREX) server.

11. A computer-implemented method as in claim 9, wherein the aggregating is performed in lieu of a complete replication of the data necessary for responding to the data request from the search engine server to the application server.

12. A computer-implemented method as in claim 9, wherein at least one of the in-memory MDAV runtime and the application server MDAV runtime comprises an online analytical processing (OLAP) runtime.

13. A computer-implemented method as in claim 9, wherein at least one of the initiating, the preprocessing, the aggregating, and the generating are performed by a system comprising at least one programmable processor.

* * * * *